Dec. 23, 1941.　　J. W. BRUNDAGE　　2,266,956
TUBE VULCANIZER
Filed April 19, 1940
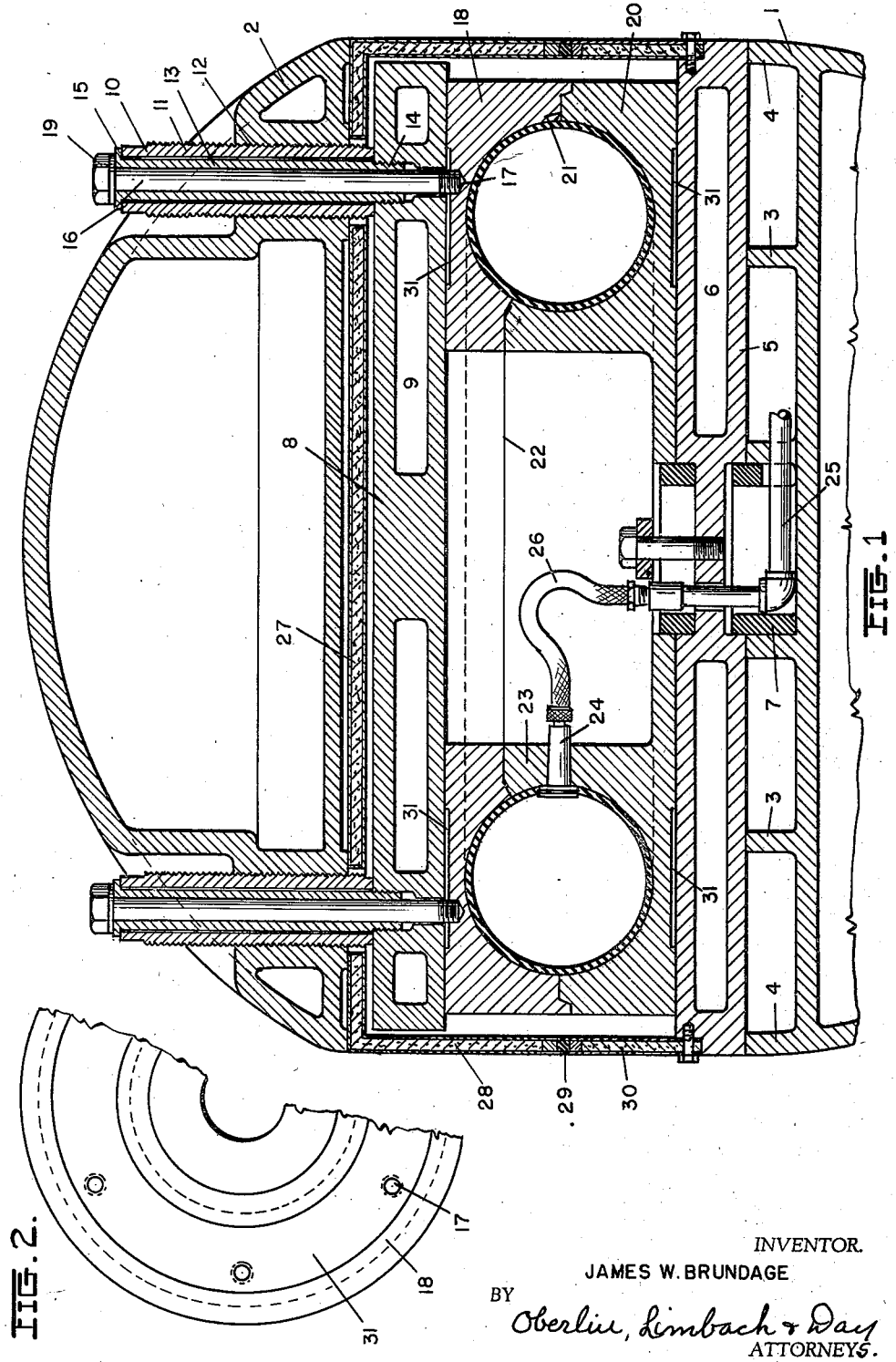
INVENTOR.
JAMES W. BRUNDAGE
BY Oberlin, Limbach & Day
ATTORNEYS.

Patented Dec. 23, 1941

2,266,956

UNITED STATES PATENT OFFICE 2,266,956

TUBE VULCANIZER

James W. Brundage, Akron, Ohio, assignor to The Summit Mold & Machine Company, Akron, Ohio, a corporation of Ohio Application April 19, 1940, Serial No. 330,577

3 Claims. (Cl. 18—19)

This invention relates as indicated to vulcanizers, and more particularly to the type of apparatus employed for the purpose of curing as by vulcanization of articles such as inner tubes and the like which are normally cured by enclosing them within the cavity provided by mating mold sections held in closed position between the elements of a press.

Vulcanizers of the character described are generally constructed by having the mating mold sections, within which the article is supported during curing operation, cored, or similarly provided with passages for the circulation therethrough of a heating medium such as steam, whereby the mold sections may be suitably heated during the vulcanizing period. This currently used type of construction has the disadvantage in that the cost of the mold sections employed is quite high since each must be a rather elaborate structure in that it is provided not only with the matrix face but the cored cavities for the circulation of the heating medium therethrough.

It is a principal object of my invention to provide a curing apparatus of the character described in which, however, the actual mold sections wherein the article is supported during the curing operation is separate and apart from the element of the apparatus through which the heating medium is circulated, with such parts arranged, however, so that there is an even distribution of heat through the mold sections.

It is a further object of my invention to provide, in an apparatus of the character described, novel means for adjustably supporting and maintaining in assembled relation the various elements which comprise the assembling. Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative however of but a few of the various ways in which the principle of the invention may be employed.

In said annexed drawing, Fig. 1 is a transverse sectional view through a vulcanizing apparatus constructed in accordance with the principles of my invention, and Fig. 2 is a fragmentary plan view of one of the mold sections in the assembly illustrated in Fig. 1.

Referring now more specifically to the drawing, and more especially to Fig. 1, the apparatus comprising my invention is generally employed in conjunction with the movable heads of a press such as is illustrated in my copending application, Serial No. 245,726. Inasmuch as the present invention does not pertain to the press itself nor the means for accommodating the press heads, it is believed sufficient to merely illustrate such press heads in outline as has been done at 1 and 2 in the drawing. The press heads 1 and 2 will be relatively movable so that the mold sections supported thereby in the manner presently to be explained may be moved into and out of engagement to define the curing chamber therebetween. Throughout the following description of my apparatus, the press head generally indicated at 1 will be denoted as the lower press head, and the press head denoted by the ordinal 2 will be referred to as the upper press head. Generally, as may be determined by having reference to my said copending applications, the upper press head is usually the movable one with the lower press head stationary.

The lower press head 1 is provided with a plurality of supporting ribs generally indicated at 3 along with the marginal flange 4 of the press head supporting a hollow platen 5 which is provided with a cored opening 6 centrally thereof for the circulation of a heating medium such as steam therethrough. A suitable ring in the form of an annulus 7 is provided for the purpose of insuring and maintaining proper alignment between the platen 5 and the lower press head 1.

A similar platen 8 is carried by the upper press head 2, and similarly to the lower platen is provided with a cored opening 9 centrally thereof for the circulation of a heating medium therethrough. The upper platen 8 is secured to, and maintained in adjustable assembled relation on the upper press head 2 by means of a plurality of bolt assemblies generally indicated at 10. These assemblies are arranged in spaced relation in an annular area about the axis of the platen.

The bolt assembly 10 comprises an outer sleeve 11 which is exteriorly threaded and thus adjustably secured in a threaded aperture 12 formed in the body of the head 2. A tubular sleeve 13 arranged concentrically within the outer sleeve is, at its lower end 14, threaded into a threaded hole in the platen 8 and, at its upper end, is provided with an integral collar 15 which rests on the upper end of the outer sleeve 10. Centrally of the inner and outer sleeve, is a bolt generally indicated at 16, the lower end 17 of which is threadably secured in a threaded hole in the upper mold half 18. The bolt 16 is provided with a head 19 by which it may be turned into the upper ends of the inner and outer sleeves and is likewise provided with flat areas for the reception of a wrench whereby they may be turned into the threaded holes which receive the same.

It will thus be observed that by the employment of the bolt assemblies generally indicated at 10 I may be able to secure both the platen 8 and the upper mold half 18 in a properly adjusted spaced relation with respect to the upper head 2. This is essential in that, by virtue of such adjustment, the upper mold half 18 may be adjusted with respect to the upper head 2 so that the effective thickness of the upper press head, including the upper mold section 18, is always the same so that the press will always close properly even though mold sections of different thicknesses may be employed.

The upper mold section 18 is complementary to a lower mold section 20, the latter resting on the lower platen 6. The parting line between the mold sections is preferably on a diametrical plane 21 in the outer portion of the molds and on an offset plane 22 on the inner portion of the molds. In this way, the green uncured tube may be properly placed within the mold cavity of the lower mold section and supported thereby without pinching while the upper mold section is closed thereon. The lower mold section 20 is provided with a slot 23 in a local area for the reception of a valve stem 24 which is usually cured with the inner tube, and by which air under pressure is introduced into the interior of the tube during the curing operation so that it is forced outwardly against the walls of the mold cavity. The provision of the slot 23 for the reception of the valve stem 24 so that it may be cured on the hemispherical plane of the tube is customary practice, and the manner in which such slot may be closed is well-known to those familiar with the art.

A suitable steam or air connection as by a pipe 25 is provided and may be connected as by a suitable flexible conduit 26 to the valve stem 24.

A layer of thermal insulation 27 is provided over the platen 8 with a marginal flange 28 around such platen, the same meeting on the parting line 29 with a similar flange of thermal insulation 30 which surrounds the lower or fixed mold section. The full insulation of the upper platen is thus provided for the reason that this platen is carried by the movable head of the press, and, therefore, requires greater insulation than does the lower platen which, as indicated, rests on ribs formed on the lower press head whereby dead air pockets serving as insulating means are provided.

The mold sections, especially when the same are formed to accommodate an inner tube, have relatively deep matrix faces so that the wall of the mold cavity in the bottom of the face is in close proximity to the steam platen against which the mold section rests, and some means must, therefore, be provided in order to insure that this area of the article will not be overcured, with relation to the rest. This is accomplished by the formation in the platen engaging faces of the mold sections of annular relieved areas 31 arranged to overlie those portions of the mold wherein the matrix face is deepest, i. e. where the wall between the steam platen and the cavity within the mold is thinnest. The provision of these annular relieved areas serves as local insulation between the steam platens and the mold sections so that the heat which is transmitted to the article in the area directly underneath the relieved areas is larger by conduction through the remainder of the molds since the dead air space defined by the relieved areas 31 is an efficient thermal insulating layer.

By the use of the described aparatus, it will be observed that the only portions of the structure which need be replaced when wear occurs or when a different size article is to be cured are the two annular mold halves which are, themselves, inexpensive since they need not be provided with cored openings and the like for the circulation of the heating fluid therethrough. By the use of a press constructed in accordance with the principles of my invention, a single press may be adapted to accommodate a large variety of sizes and types of molds, and by the nature of their construction, the individual molds thus accommodated for the curing of a large variety of different articles are, themselves, inexpensive. These desirable ends are accomplished, not only by the formation of the relieved areas 31 in the molds themselves which act as heat barriers insuring an even distribution of heat throughout the entire mold section, but also by the supporting screw assemblies 10 by which molds of various sizes may be accommodated in a single press.

Other modes of applying the principle of the invention may be employed, change being made as regards the details described, provided the features stated in any of the following claims or the equivalent of such be employed.

I therefore particularly point out and distinctly claim as my invention:

1. In a curing press, the combination of relatively movable press heads, heating platens respectively overlying said heads and complementary mold sections respectively engaged by said respective platens, said mold sections provided with relatively deep matrix faces and relieved areas on their platen engaging faces opposite the deepest portions of their matrix faces whereby the mold sections in the deepest area of their matrix faces are held out of contact with said platens.

2. In a curing press, the combination of relatively movable press heads, heating platens respectively overlying said heads and complementary mold sections respectively engaged by said respective platens whereby said mold sections are heated by conduction, said mold sections provided with relatively deep matrix faces and relieved areas on their platen engaging faces opposite the deepest portions of their matrix faces whereby the mold sections in the deepest area of their matrix faces are held out of contact with said platens, and a shell of thermal insulation about at least a portion of the assembly.

3. In a curing press, the combination of relatively movable press heads, heating platens respectively overlying said heads and complementary mold sections respectively engaged by said respective platens whereby said mold sections are heated by conduction, said mold sections provided with relatively deep matrix faces and relieved areas on their platen engaging faces opposite the deepest portions of their matrix faces whereby the mold sections in the deepest area of their matrix faces are held out of contact with said platens and means maintaining one of said heating platens in contact with the respective mold sections engaged thereby and in a position adjustable with respect to the press head carrying such platen.

JAMES W. BRUNDAGE.